(12) United States Patent
Monheim et al.

(10) Patent No.: US 7,897,100 B2
(45) Date of Patent: Mar. 1, 2011

(54) METHOD AND DEVICE FOR THE CONTINUOUS PRODUCTION OF STEEL USING METAL CHARGE MATERIAL

(75) Inventors: Peter Monheim, Dorsten (DE); Wolfgang Reichelt, Moers (DE); Walter Weischedel, Meerbusch (DE)

(73) Assignee: SMS Siemag Aktiengesellschaft, Dusseldorf (DE)

( * ) Notice: Subject to any disclaimer, the term of this patent is extended or adjusted under 35 U.S.C. 154(b) by 1302 days.

(21) Appl. No.: 10/498,632

(22) PCT Filed: Jan. 9, 2003

(86) PCT No.: PCT/EP03/00123
§ 371 (c)(1),
(2), (4) Date: Mar. 17, 2005

(87) PCT Pub. No.: WO03/068995
PCT Pub. Date: Aug. 21, 2003

(65) Prior Publication Data
US 2005/0155457 A1    Jul. 21, 2005

(30) Foreign Application Priority Data
Feb. 12, 2002    (DE) .................................. 102 05 660

(51) Int. Cl.
*C21C 5/35*    (2006.01)
(52) U.S. Cl. ......... 266/142; 266/212; 266/217; 266/225; 266/265
(58) Field of Classification Search .................. 266/217, 266/265, 212, 225, 142
See application file for complete search history.

(56) References Cited

U.S. PATENT DOCUMENTS
3,194,295 A * 7/1965 Servanty et al. .................. 431/1
(Continued)

FOREIGN PATENT DOCUMENTS
DE    8437922    10/1987
(Continued)

OTHER PUBLICATIONS
Liuyi Zhang et al: "Simulationsmodell Zur Berechnung Der . . .", Stahl und Eisen, Dusseldorf, DE, Bd. 115, No. 5, May 15, 1995, pp. 75-82.
(Continued)

*Primary Examiner* — George Wyszomierski
*Assistant Examiner* — Tima M McGuthry-Banks
(74) *Attorney, Agent, or Firm* — Lucas & Mercanti, LLP; Klaus P. Stoffel

(57) ABSTRACT

The invention relates to a method and device for the continuous production of steel using metal charge material (8) that is preheated in an upper part of a melting vessel (2), is then melted in a lower part (9) of the melting vessel l(2) with fossil fuels (23) and the molten material (16) is continuously discharged into a treatment vessel (3) in which the desired steel quality is adjusted while gases (22) are introduced into the melting vessel (2) from the exterior to afterburn the melting exhaust gases (13). The aim of the invention is to improve the aforementioned afterburn step while at the same time reducing oxidation of the iron-containing charge materials. For this purpose, the process gases (13) are step-wise afterburned when ascending in the melting vessel (2) by introducing the afterburn gases (22) into the interior of the charge material column by way of an interior shaft (5) that projects into the material column and in whose walls (20) inlet openings (21) for the gases (22) are disposed and form afterburn planes (E1, E2) arranged one on top of the other. The invention also relates to a device for carrying out the inventive method.

11 Claims, 4 Drawing Sheets

U.S. PATENT DOCUMENTS

| | | | | |
|---|---|---|---|---|
| 3,353,807 | A | * | 11/1967 | Sixel et al. ............ 266/159 |
| 3,890,139 | A | * | 6/1975 | Suzuki et al. ............ 75/627 |
| 4,120,696 | A | * | 10/1978 | Geck et al. ............ 75/10.15 |
| 5,074,906 | A | * | 12/1991 | Granstrom et al. ........ 75/10.36 |
| 5,378,261 | A | * | 1/1995 | Aizatulov et al. ........... 75/528 |
| 5,885,323 | A | * | 3/1999 | Kim et al. ................ 75/387 |

FOREIGN PATENT DOCUMENTS

| | | |
|---|---|---|
| DE | 101952 | 2/1998 |
| WO | 0118259 | 3/2001 |

OTHER PUBLICATIONS

Langhammer, H.-J.E.A.: "Entwicklung Eines Kontinuierlichen . . ." Stahl und Eisen, Bd. 92, No. 11, May 25, 1972, pp. 501-518.

\* cited by examiner

METHOD AND DEVICE FOR THE CONTINUOUS PRODUCTION OF STEEL USING METAL CHARGE MATERIAL

The invention concerns a process for the continuous production of steel with the use of metal charge materials, such as scrap, sponge iron, or the like, wherein the charge materials are preheated in an upper part of a melting vessel and then melted in a lower part of the melting vessel using fossil fuels, wherein the molten metal is continuously discharged into a treatment vessel, in which the desired grade of steel is adjusted, and wherein gases are introduced into the melting vessel from the outside for post combustion of the process gases.

The invention also concerns equipment for the continuous production of steel with the use of metal charge materials, which comprises a melting vessel with at least one fossil fuel burner that acts on the metal charge materials in a lower part of the melting vessel, and a treatment vessel, which is connected with the lower part of the melting vessel by a taphole, such that the molten metal is continuously discharged into the treatment vessel, in which the desired grade of steel is adjusted, such that the charge materials are preheated in an upper part of the melting vessel by the process gases, and such that gases are introduced into the melting vessel from the outside for post combustion of the process gases. In the treatment vessel, the molten iron is subjected especially to superheating and an alloying treatment to produce steel.

A method of this type and equipment of this type are described in DT 2 325 593. A method is described for the continuous production of steel with the use of charge materials, such as scrap, sponge iron, or the like, which are continuously melted from below by a burner lance in a shaft furnace, which serves as the melting vessel, wherein the molten metal is discharged into a heated continuous vessel, in which slag separation is carried out continuously, and wherein the material present in the vessel is superheated, and the desired steel analysis is adjusted by the addition of suitable alloying additives and deoxidation additives. The superheating and slag reduction are accomplished electrically. The continuous vessel is heated for this purpose by induction or by an electric arc. A lance-like oil/oxygen burner is inserted in the shaft furnace by means of a lance guide in such a way that it can be moved vertically into the interior of the melting vessel, and the flame produced by the burner acts on the charge material from below and continuously melts it. Air for post-combustion of the exhaust gases from the melting process, which are used to preheat the material to be melted, can be introduced through an annular gap in the casing of the shaft furnace. The interior of the melting vessel is essentially cylindrical and can have a diameter that increases slightly towards the bottom.

This continuous process of melting scrap by the countercurrent principle is also described in *Stahl und Eisen*, 92 (1972), No. 11, p. 501. In this mode of operation, a column of scrap is melted from below with an oil/oxygen burner. The molten metal runs continuously out of the melting vessel together with the iron oxide slag that forms. At the same time, the column of scrap is replenished by continuous recharging. A problem associated with this process is that, although the sensible heat is used, the share of chemically bound exhaust gas heat remains unutilized for preheating. Moreover, the process has the problem of high iron oxidation due to the use of fossil fuels in combination with oxygen.

A different direction of development is described in *Stahl und Eisen* 115 (1995), No. 5, p. 75. In this case, scrap is preheated in a preheating column and melted down in an iron bath reactor. Either the preheating can occur in the iron bath reactor itself before the melting, or the scrap is preheated in a basket located above the melting reactor and then allowed to fall into the reactor. During the melting, coal and oxygen are blown into the iron bath, and the exhaust gases can be post-combusted above the melt in the reactor. To minimize oxidation of the scrap during the preheating, the fuel gas is burned in stages during the preheating.

The objective of the present invention is to optimize a process of this general type and equipment of this general type with the introduction of melting energy by fossil fuels and with utilization of the chemical exhaust gas heat to preheat the charging material.

This objective is achieved by equipment with the features specified in Claim 1. Advantageous modifications are described in the dependent claims and in the description of the specific embodiments.

In accordance with the process of the invention, as the process gases ascend in the melting vessel, they are post-combusted in stages in post-combustion planes (E1-E4) arranged one above the other, such that, to accomplish this, in addition to the post-combustion gases introduced into the column of charge materials from the outside, post-combustion gases, i.e., oxidizers, such as oxygen, air, or a mixture thereof, are also introduced or injected into the interior of the column of charge materials through an interior shaft that projects into the column of charge material.

Optimum post combustion with a low level of oxidation of the charge material and thus a high degree of efficiency of the utilization of the chemical heat of the exhaust gases are achieved by the combination of post combustion in stages and the introduction of post-combustion gases into the column of charge materials both from the outside and from the inside. Due to the interior shaft, fossil energy can be effectively introduced into the column of charge material, so that favorable heat transfer and lower iron oxidation are achieved. The post-combustion gas must move only short distances to achieve mixing and thus post combustion of the process gases.

Advantageously, the amount, type, and/or composition of the post-combustion gases is adjusted as a function of the properties of the process gases along the height of the melting vessel, preferably in each post-combustion plane or in most of the post-combustion planes, and as a function of the desired degrees of post combustion at a certain height, for example, by suitable metering of mixtures of air and oxygen. It is also proposed that the post combustion be influenced by, among other means, adjustment of the amount, type, and/or composition of the oxidizers and fossil fuels and by the position of the burner in relation to the interior shaft.

In particular, it is proposed that the post-combustion planes be adjusted in height by varying the arrangement of the interior shaft relative to the melting vessel and/or that they be adjusted by rotation of the interior shaft about its longitudinal axis. In this way, the post-combustion planes, which are formed by the admission of post-combustion gases from the outside and the inside, can be variably adjusted relative to one another. In accordance with an especially preferred refinement of the invention, at least a portion of the process gases to be post-combusted is removed from the column of charge materials, and these process gases are post-combusted outside the column of charge materials, especially outside the melting vessel. The post-combusted process gases are then returned to the column of charge materials in a plane above the plane from which they were removed.

The post combustion occurs in corresponding combustion spaces, which are separate from the column of material and into which the post-combustion gases are introduced. To this end, feed lines for the post-combustion gases open into the combustion spaces, and the post-combustion gas comes into contact with the process gases circulating through the combustion gases. Introduction of the post-combustion gases with an injector effect is especially advantageous due to an entrainment effect.

With respect to the equipment of the invention, the melting vessel has a centrally arranged hollow interior shaft, which extends into the melting vessel from above along the longitudinal axis of the melting vessel. This results in the formation of an annular shaft furnace. The wall of the interior shaft has inlets for post-combustion gases, which are arranged one above the other along the casing of the interior shaft and form the post-combustion planes that are arranged one above the other. The inlets are connected especially with separate feed gas lines. This makes it possible to introduce the post-combustion gases or oxidizers into the scrap column containing the charge material from the inside according to the desired post-combustion distribution.

Preferably, measuring instruments are provided for determining the properties of the process gases along the given height of the melting vessel, preferably in each post-combustion plane or in selected post-combustion planes, and means are provided for making corresponding adjustments of the type, amount, and/or composition of the gases being admitted for the post combustion.

It is proposed that the inlets arranged in a given plane in the melting vessel have a staggered arrangement in relation to two planes of inlets of the interior shaft that are arranged one below the other, i.e., post-combustion planes arranged one above the other are alternately formed by the interior shaft inlets and the inlets in the vessel wall, which can be varied by adjusting the interior shaft relative to the melting vessel. This makes it possible to adjust not only the type, amount, and composition of the post-combustion gases, but also the post-combustion planes.

In accordance with an especially preferred embodiment, not only the process gases formed during the melting are post-combusted to utilize the chemical energy, but also the process gases formed during the treatment of the molten metal in the treatment vessel. For this purpose, the gas spaces of the two vessels are connected with each other in a gastight manner.

Energy is supplied primarily by fossil fuels in combination with oxidizers, for example, a natural gas/oxygen mixture or oil/oxygen mixture without conversion to an electric form. In this regard, the treatment vessel should also be operated at least partly by means of fossil energy, while the remaining energy is supplied in the form of electric energy.

To achieve further reduction of undesired oxidation of the iron-bearing charge materials during a post combustion, at least part of the post combustion of the gases, preferably a large part, should be carried out in a place that is spatially separated from the column of charge material, specifically, in the post-combustion spaces or channels, which are integrated in the wall of the melting vessel or outside the melting vessel and/or in the interior shaft, and into which the feed lines for post-combustion gases open, and in which the gas emerging from the inlets, which supports the post combustion, comes into contact with the exhaust gases circulating in the channel. Preferably, these channels can also be provided in the region in which the inlets open in the wall of the interior shaft. Post combustion of the exhaust gases in the combustion spaces that are separated from the scrap column has the additional advantage that the scrap is not overheated. In accordance with an especially preferred embodiment, a combustion space extends annularly around the melting vessel. Alternatively, it is possible to provide several independent spaces, which are arranged especially side by side at the same height. In accordance with another embodiment, the combustion spaces are formed as lines, into which the process gas on a (lower) plane is drawn in, and which convey the post-combusted process gas back into the shaft on a plane situated at a higher level. The suction effect is based on the fact that the flow resistance for the process gases through the column of material is higher than the flow resistance through the lines.

Additional details and advantages of the invention are apparent from the dependent claims and from the following description, in which the embodiments of the invention illustrated in the drawings are explained in detail. In this connection, besides the combinations of features specified above, features alone or in other combinations are an integral part of the invention.

Figure 1:
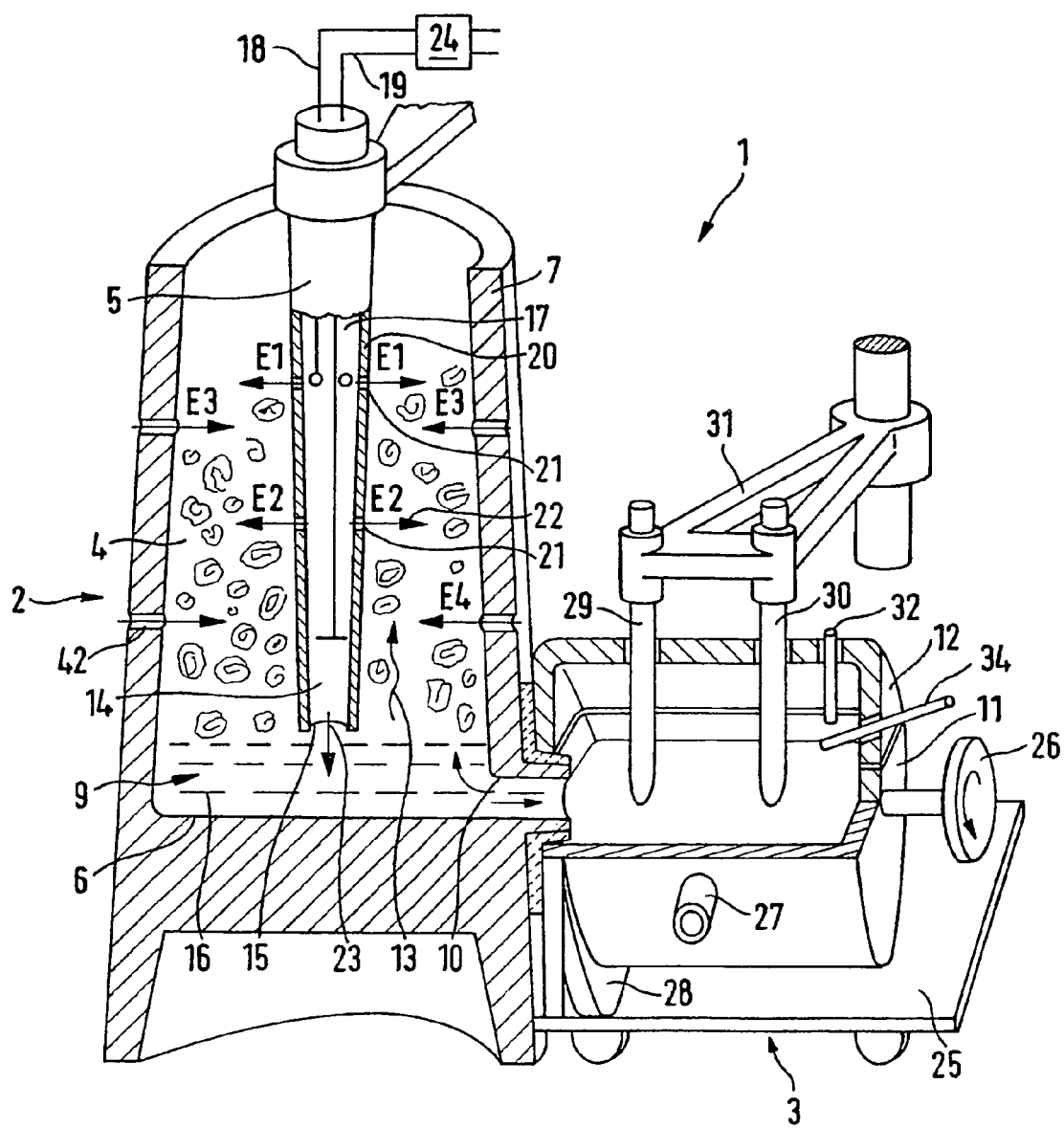
FIG. 1 shows a partial sectional side view of equipment in accordance with the invention for producing steel with a melting vessel and a treatment vessel.

FIG. 1 shows equipment 1 for the continuous production of steel with the use of metal charge materials, especially scrap. It consists of a melting vessel 2 and a superheating and treatment vessel 3 installed next to it, i.e., a furnace in which superheating of the melt produced in the melting vessel 2 and alloying adjustments of the steel are carried out. The melting vessel 3 comprises a shaft 4, into which an interior shaft 5 extends gastight from above, not quite to the lower part 6, here the base, of the shaft 4 and substantially up to a level of a taphole 10. An annular shaft furnace is formed in this way. Hereinafter, the melting vessel 3 will be referred to as the shaft furnace. In the embodiment shown in the drawing, the vessel wall 7 of the shaft furnace has the shape of a cone whose diameter increases towards the bottom, while the interior shaft 5 has the shape of a cone with decreasing diameter towards the bottom. As a result of this expanding structure of the shaft furnace, the scrap column 8, which is charged from above, is more mobile from top to bottom, and the free space that forms towards the bottom allows sufficient scrap to advance from top to bottom. In the meltdown zone 9, i.e., in the lower third of the shaft furnace, the shaft furnace can become cylindrical or can even be designed with the opposite conical shape, i.e., with decreasing diameter towards the bottom. The opposite conical shape of the interior shaft 5 increases this free space towards the bottom; however, the interior shaft may also be cylindrically shaped.

The shaft furnace is connected with the treatment vessel 3 via a taphole 10 arranged in the lower part and a refractory seal. In the embodiment shown here, the treatment vessel 3 consists essentially of a lower molten bath vessel part 11 and an upper vessel part 12. The process is carried out by charging scrap 8 into the shaft furnace from above. The scrap column is preheated by the hot exhaust gases 13 from the treatment vessel 3 and the shaft furnace, which flow in the opposite direction from the scrap, and is melted down in the lower part 9 of the shaft furnace by a burner 14, which is integrated in the tip 15 of the interior shaft 5. The molten metal 16 flows continuously into the lower molten bath vessel part 11 of the treatment vessel 3 through the taphole 10. In the opposite direction, exhaust gases from the treatment vessel 3 can flow through the taphole 10 or through a separate gas line into the melting vessel.

The interior shaft 5, which extends centrally into the scrap column 8, has feed lines 18, 19 in its hollow interior space 17 and inlets 21 in its wall 20 for systematically conveying post-combustion gases or oxidizers 22 brought in through the feed lines 18 from the interior shaft 5 to the scrap column 8. The inlets 21 are located in planes E1, E2 arranged one above the other. They are arranged radially in the wall 20 of the interior shaft 5 and transversely with respect to the longitudinal axis of the interior shaft. In this way, they form post-combustion planes E1, E2, which can expand into sectors as a result of the flow of the exhaust gas. It is also possible for several inlets to be arranged directly one above the other to form a sector. The hot exhaust gases 13 flowing through the scrap 8 are post-combusted according to the given post-combustion plane E1, E2 and according to the mixture of post-combustion gases 22 adjusted for the given post-combustion plane.

In addition, the tip 15 of the interior shaft 5 facing the bottom 6 of the shaft furnace 4 has a burner 14, which is supplied with fossil fuels 23 by a separate feed line 19. The fossil energy sources 23 are preferably gas/oil, which, together with oxidizers (for example, oxygen, air, or mixtures thereof) introduced through a separate line, are mixed and burned in the burner. The combustion of the fossil fuels to melt the scrap 8 is preferably carried out with less than the stoichiometric amount of oxygen, so that less oxygen is available for oxidation of the iron.

By feeding the gases 22 that support the post combustion and the fuels 23 necessary for melting the scrap through the interior shaft 5, they are already preheated. To increase the degree of preheating, a heat-exchange unit 24 may be installed outside the interior shaft 5. The gases and fuels 22, 23 are then heated by countercurrent heat exchange with hot exhaust gases 13.

After preheating and melting of the scrap 8, the melt 16 is continuously discharged into the treatment vessel 3. The treatment vessel 3 is rotatably supported. After the steel treatment has been completed, the vessel is rotated about an axis of rotation 26 that is parallel to the horizontal foundation 25 to tap first the slag and then the molten steel through a taphole 27 in the lower part 11 of the vessel. To this end, the lower part 11 of the vessel is supported in a swivel mechanism 28. It can be moved up to the melting vessel 2 by means of a movable bottom plate 25. In the illustrated embodiment, the treatment vessel 3 is designed as an arc furnace with two electrodes 29, 30, which are positioned in the furnace by a holding device 31. However, the power may also be supplied with three-phase current through three electrodes. The energy necessary for treatment of the melt can also be introduced by fossil fuels. The treatment vessel 3 is closed by an upper vessel part 12 or a cover. A lance 32 for supplying carbon sources and/or oxygen or air is provided in the cover for carrying out the superheating and slag foaming. In addition, the vessel 3 has a charging device 34 for supplying additives for the metallurgical treatment of the melt.

Figure 2:
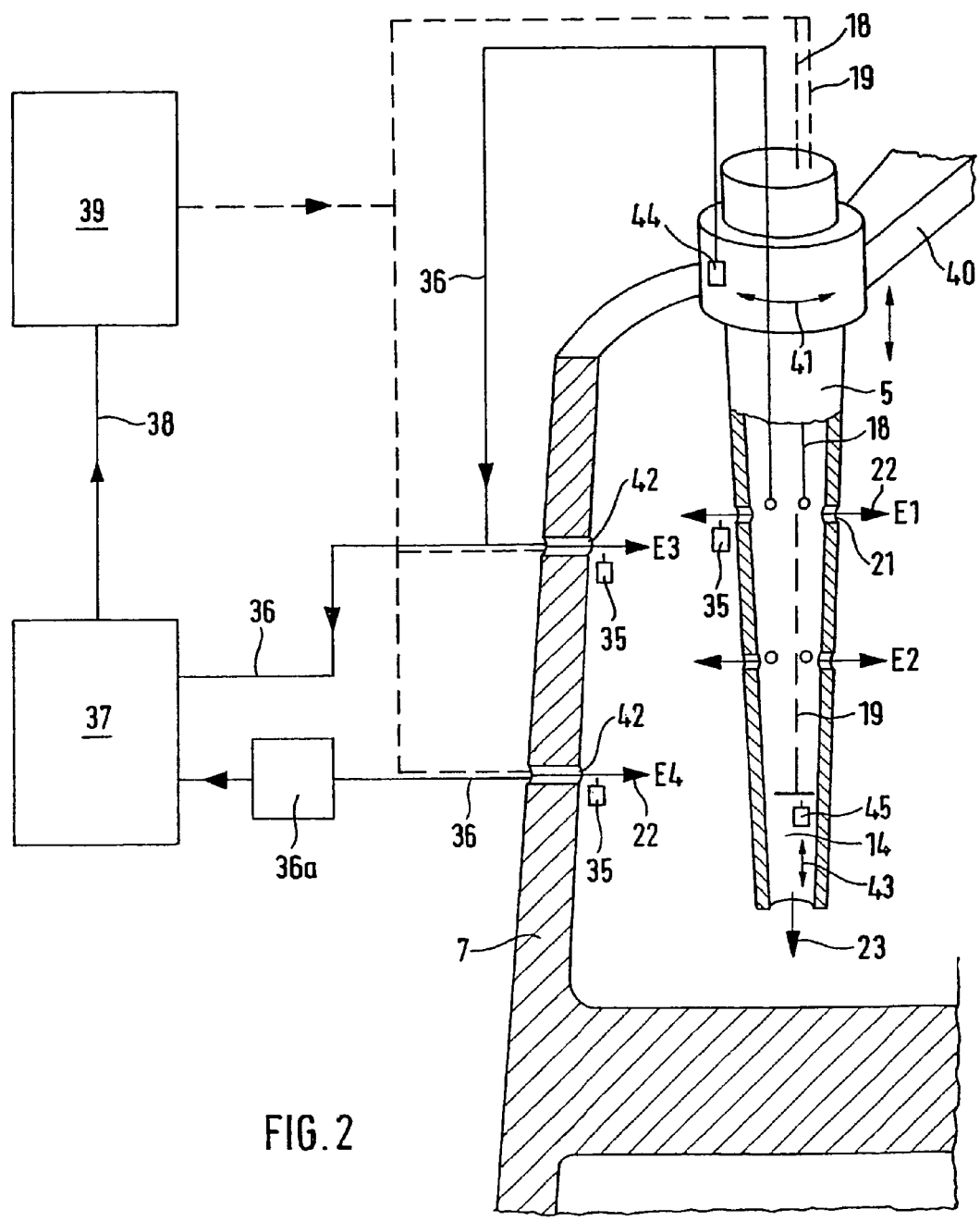
FIG. 2 shows a partial section of FIG. 1 showing the measurement and control engineering for carrying out the post combustion in stages.

The positioning of the post-combustion planes E1, E2 in relation to the melting vessel and thus in relation to the post-combustion planes E2, E4 and the properties of the emerging gases 22 are controlled or automatically regulated in the given post-combustion planes as a function of the properties of the process gases along the height of the melting vessel. This is shown in FIG. 2. In each post-combustion plane or in selected post-combustion planes, means 35 are provided for determining the given process gas properties at a given height of the melting vessel. These means 35 take and further convey gas samples or determine the composition and measure the temperature of the hot process gases. The process gas samples taken in the post-combustion planes can be analyzed in an analyzer 36a. Depending on these results, which are transmitted to a computer unit 37 over instrument leads 36, the properties of the gases 22 for the post combustion are calculated, and suitable adjustment means 39 are activated over control lines 38. These adjustment means 39 comprise, for example, metering and mixing devices for air and oxygen, i.e., a distributor of the oxidizing agents for the individual post-combustion planes.

The post combustion is controlled not only by adjustment of the parameters of the gases 22, but also by variation of the arrangement of the interior shaft 5 relative to the shaft furnace or by variation of the position of the burner 14 in the interior shaft 5. The interior shaft 5 can be moved along the longitudinal axis of the shaft furnace by positioning mechanisms or a positioning device 40. In addition, turning mechanisms 41 may be provided, which allow the interior shaft 5 to be rotated about its longitudinal axis. The interior shaft 5 preferably can be rotated up to an angle of at least $0.5\phi$ relative to the shaft furnace (see FIG. 3) to allow favorable positioning of the inlets 21 in the interior shaft 5 in relation to the inlets 42 in the vessel wall 7 of the outer shaft. The inlets 42 are further discussed below. Each of the one or more burners 14 can be moved within the interior shaft 5 by positioning mechanisms 43.

At the same time, measuring devices 44 for determining the position of the interior shaft 5 in relation to the shaft furnace and measuring devices 45 for determining the position of the burner 14 in the interior shaft 5 are provided. These measurement results are also transmitted to the computer unit 37 and are used to control or automatically regulate the properties of the gases 22, 23 for the post combustion via appropriate actuation of the positioning and turning mechanisms 40, 41, 43. This preferably occurs in such a way that local overheating of the surface of the scrap to greater than 90% of the melting point of iron oxide is not reached in any post-combustion plane or post-combustion sector, and that the degree of post combustion of the exhaust gas emerging from the melting vessel is approximately 100%.

Figure 3:
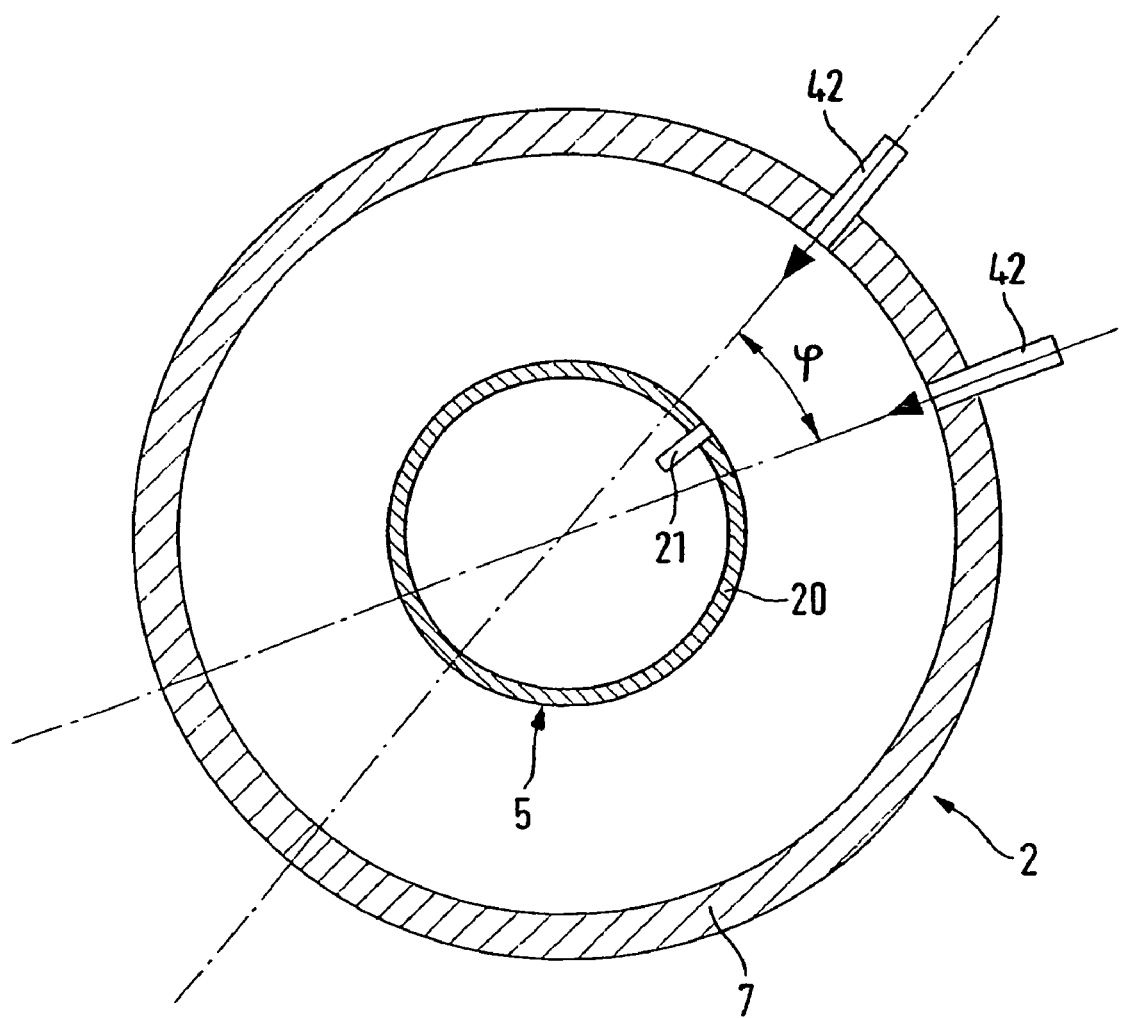
FIG. 3 shows a cross section through the melting vessel with an interior shaft.

In addition to the inlets 21 in the interior shaft 5, inlets 42 are arranged in the wall 7 of the melting vessel 4 and are connected to feed lines for post-combustion gases 22. In this regard, the planes E1, E2 and E3, E4 formed by the interior shaft inlets 21 and the vessel wall inlets 42, respectively, are offset relative to each other, so that a post-combustion plane with inlets 42 from the outside of the vessel and a post-combustion plane with inlets 21 from the inside of the interior shaft 5 alternate from bottom to top. The amount by which they are offset is up to 50% of the distance between the planes of the inlets. This offset arrangement prevents it from becoming too hot in individual places in the scrap column 8, while other regions remain too cold, so that post combustion does not occur. The external and internal injection ports or slots are arranged in such a way that the inlets do not interfere with one another, but rather create favorable gas distribution in the scrap column by their arrangement relative to one another. In addition, FIG. 3 illustrates a preferred configuration of the angle of the inlets 21, 42 relative to each other. The inlets 42 in the wall 7 of the melting vessel 2 are arranged at an angular displacement of up to $0.5\phi$, preferably at an angular displacement of $0.5\phi$, relative to the inlets 21 in the interior shaft 5, where 9 is the angle between two adjacent inlets 42 in a post-combustion plane.

Figure 4:
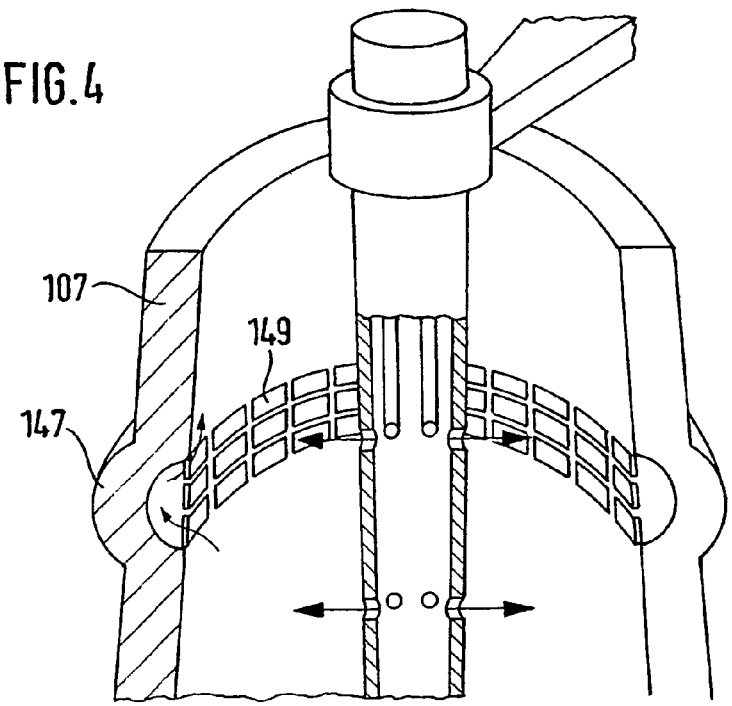
FIG. 4 shows a sectional view of a preferred embodiment of the melting vessel with an annular combustion space.
Figure 5:
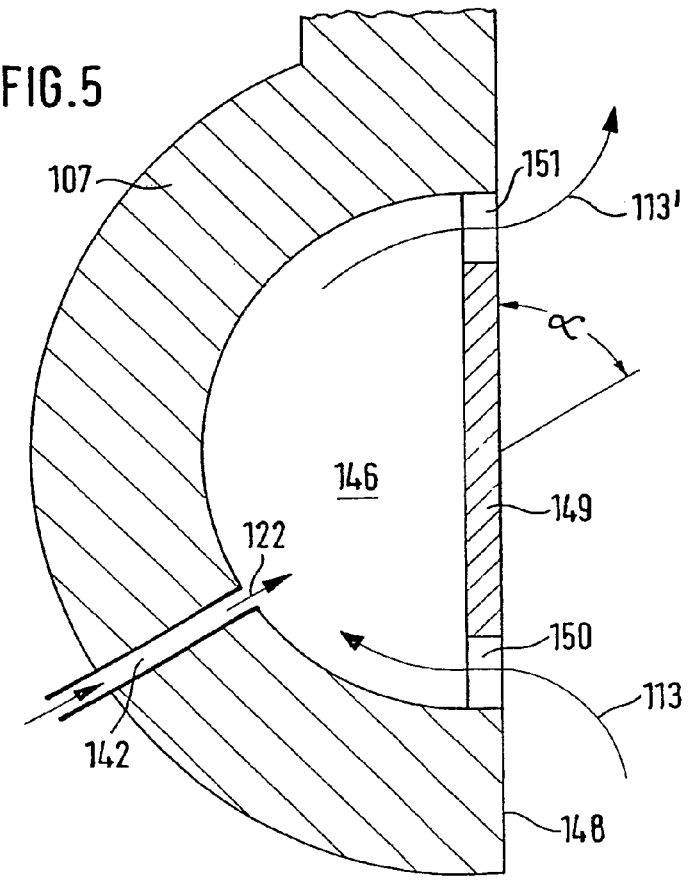
FIG. 5 shows a detail view of FIG. 4.

In accordance with an especially preferred embodiment, which is illustrated in FIGS. 4 and 5, the wall 107 of the shaft furnace is provided with an annular channel or combustion space 146 at the height of the inlets 142.

In the design shown here, this combustion space 146 consists of a bulge 147 in the vessel wall 107, such that the interior of the combustion space 146 is separated from the interior of the shaft furnace and thus from the scrap column 8 by a partition 149 that is formed as a continuation of the inside surface 148 of the vessel wall 7. This partition 149 is positioned at the combustion space 146 in such a way that an inlet zone 150 for process gases 113 flowing past it is formed at the bottom, and an outlet zone 151 for post-combusted gases 113' is formed at the top. This allows the process gases 113 to circulate through the combustion space or channel 146 and the post combustion to occur to a large extent in the combustion space or channel 146. FIG. 5 shows the arrangement of the inlet's 142 in the vessel wall 107 of the shaft furnace in relation to the partition 149. The angle α formed by the opening of the inlet ports 142 or slots between the linear extension of the opening and the partition 149 can take on values between 90° and −90°. The opening angle is preferably determined in such a way that an entrainment effect is produced for the process gas flowing in. The inlet 142 can also be designed as a de Laval nozzle, i.e., a nozzle that first converges and then diverges to produce acceleration of the gases.

All together, the proposed process and equipment offer an effective possibility for steel production with the use of fossil energy and are therefore also of interest for use in sites with poor electric energy supply.

The invention claimed is:

1. Equipment (1) for the continuous production of steel with the use of metal charge materials (8), which comprises a melting vessel (2) with at least one burner (14) for fossil fuels (23) that acts on the charge materials in a lower part (9) of the melting vessel (2), and a treatment vessel (3), which is connected with the lower part (6) of the melting vessel (2) by a taphole (10), such that the molten metal (16) is continuously discharged into the treatment vessel, in which the desired grade of steel is adjusted, such that the charge materials (8) are preheated in an upper part of the melting vessel (2) by the process gases (13), and such that gases (22) are introduced into the melting vessel (2) from the outside for post combustion of the process gases (13), wherein the melting vessel (2) has a central hollow interior shaft (5), which extends from above into the melting vessel (2) along the longitudinal axis of the melting vessel (2) substantially up to a level of the tap hole, and that the wall (20) of the interior shaft (5) has inlets (21) that connect an interior of the shaft (5) with an interior of the melting vessel (2) for introducing post-combustion gases (22) from the interior of the shaft (5) to the interior of the melting vessel (2), which are arranged one above the other along the casing of the interior shaft for post combustion of the process gases (13) in stages in post-combustion planes (E1-E4) arranged one above the other, wherein the interior shaft (5) has feed means (19) for introducing fossil fuels to at least one burner (14) arranged at an end of the interior shaft that projects into the charge materials (B).

2. Equipment in accordance with claim 1, wherein it has means (35) for determining the properties of the process gases along the height of the melting vessel (2) and means (39) for adjusting the type, amount, and composition of the post-combustion gases (22) for post combustion of the process gases (13) in stages with a certain degree of post combustion.

3. Equipment in accordance with claim 1, wherein a plurality of inlets (21) with separate feed lines (18) for post-combustion gases (22) are arranged at specific heights along the circumference of the interior shaft (5).

4. Equipment in accordance with claim 1, wherein inlets (42) of the melting vessel (2) are arranged in a given plane (E3, E4) and are offset relative to two planes (E1, E2) of inlets (21) of the interior shaft (5), which are arranged one below the other.

5. Equipment in accordance with claim 1, wherein means (40) for moving the interior shaft along the longitudinal axis of the melting vessel (2) and/or means (41) for rotating the interior shaft (5) about its longitudinal axis are provided.

6. Equipment in accordance with claim 1, wherein means (43) for moving the at least one burner (14) inside the interior shaft (5) are provided.

7. Equipment in accordance with claim 1, wherein an upper part (12) of the treatment vessel (3) has a gas discharge line, which is connected gastight with the lower part (6) of the melting vessel, and the process gases (13) that form during the adjustment of the steel grade in the treatment vessel (3) flow into the lower part of the melting vessel (2) and preheat the charge materials (8) as they ascend in the melting vessel.

8. Equipment in accordance with claim 4, wherein the inlets (42) are arranged in a wall (7) of the melting vessel (2) at an angular displacement of up to 0.5 j relative to the inlets (21) in the interior shaft (5), where j is the angle between two adjacent inlets (42) in a post-combustion plane with the center of the interior shaft as the vertex of the angle.

9. Equipment in accordance with claim 1, wherein post-combustion spaces (146) for post combustion of the process gases (113) outside a column of charge materials are arranged along the wall (107) of the melting vessel or outside the melting vessel and/or in the wall of the interior shaft or inside the interior shaft, such that inlets (142) for the post-combustion gases (122) or the oxidizers open into the post-combustion spaces (146).

10. Equipment in accordance with claim 1, wherein it has a heat-exchange unit (24), through which the gases (22) that support the post combustion and the gases (23) for the burners (14) flow in countercurrent with respect to the hot exhaust gases (13).

11. Equipment in accordance with claim 1, wherein the treatment vessel (3) is constructed in such a way that it can be moved and interchanged in whole or in part and acts as a buffer for the metallurgical process line between the melting vessel (2) and subsequent processing stations, especially a continuous casting plant.

* * * * *